US012649590B1

(12) United States Patent
Wu et al.

(10) Patent No.: US 12,649,590 B1
(45) Date of Patent: Jun. 9, 2026

(54) OUTER SPACE-BASED VEHICLE WITH A PAYLOAD STEERING ARRANGEMENT

(71) Applicant: EAGLE TECHNOLOGY, LLC, Melbourne, FL (US)

(72) Inventors: Gordon Chun Kong Wu, Melbourne, FL (US); Robert Riley, Melbourne, FL (US); Alan W. Mast, Melbourne Beach, FL (US); Brinnan C. Riley, West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 244 days.

(21) Appl. No.: 18/482,155

(22) Filed: Oct. 6, 2023

(51) Int. Cl.
*B64G 1/66* (2006.01)
*H01Q 1/28* (2006.01)

(52) U.S. Cl.
CPC .............. *B64G 1/66* (2013.01); *H01Q 1/288* (2013.01)

(58) Field of Classification Search
CPC ...................................................... H01Q 1/288
See application file for complete search history.

(56) References Cited

U.S. PATENT DOCUMENTS 6,463,365 B1    10/2002  Anagnost et al.
7,185,855 B2 *   3/2007  Peck ...................... B64G 1/285
                                              74/5.34

9,921,459 B2     3/2018  Wagner et al.
2003/0160132 A1 *  8/2003  Osterberg .............. B64G 1/286
                                              244/165
2006/0076459 A1 *  4/2006  Dailey ..................... B64G 1/66
                                              244/173.1
2017/0081050 A1 *  3/2017  Gans ...................... G01C 19/16
2020/0007232 A1 *  1/2020  Cahoy ................. B64G 1/2221
2020/0377237 A1 * 12/2020  Hanson ................. B64G 1/244

OTHER PUBLICATIONS

Sasaki et al., "Attitude and vibration control with double-gimbal variable-speed control moment gyros", Acta Astronautica, vol. 152, Nov. 2018, pp. 740-751.
Blake Currie, "Control of a spacecraft using mixed momentum exchange devices", Oct. 2014, pp. 1-73.

* cited by examiner

*Primary Examiner* — James M Mcpherson
*Assistant Examiner* — Clint Pham
(74) *Attorney, Agent, or Firm* — ALLEN, DYER, DOPPELT, + GILCHRIST, P.A.

(57) ABSTRACT

An outer space-based vehicle may include a spacecraft bus, a payload having a payload center of mass, and a gimbal coupled between the spacecraft bus and the payload. The gimbal may have a gimbal axis aligned with the payload center of mass, and is configured to selectively rotate the payload about the gimbal axis. At least one payload momentum wheel may be coupled to the gimbal at the gimbal axis, and configured to counteract angular torque which would otherwise be imparted to the spacecraft bus.

29 Claims, 4 Drawing Sheets

OUTER SPACE-BASED VEHICLE WITH A PAYLOAD STEERING ARRANGEMENT

TECHNICAL FIELD

The present disclosure relates to outer space-based vehicles, and, more particularly, to a payload steering arrangement for an outer space-based vehicle and associated methods.

BACKGROUND

Outer space-based vehicles may include a payload coupled to a satellite bus. The payload may be an antenna, for example. Once the outer space-based vehicle is in orbit, the antenna may need to be rotated from a current field of view to a desired field of view.

Some antennas may be electronically steered, for example. An electronically steered antenna may have a plus or minus 30° of scan in a horizontal axis and a plus or minus 3° of scan in a vertical axis, for example. The field of view in the vertical axis may not be enough to place the antenna in the desired field of view. Consequently, the antenna needs to be mechanically steered.

One approach is to rotate the satellite bus to position the antenna in the desired field of view. A disadvantage of this approach is that that the attitude of the satellite bus is changed, which may negatively affect inter-satellite communications, for example.

Another approach is to rotate the antenna using a gimbal. The angular torque generated by the gimbal is to be countered by the satellite bus. A disadvantage of this approach is that the satellite bus may not provide enough torque to counter the payload angular momentum. This is typically the case when the mass of the payload is more than the mass of the satellite bus. As a result, rotation of the payload causes the satellite bus to change its attitude.

SUMMARY

An outer space-based vehicle may include a spacecraft bus, a payload having a payload center of mass, and a gimbal coupled between the spacecraft bus and the payload. The gimbal may have a gimbal axis aligned with the payload center of mass, and is configured to selectively rotate the payload about the gimbal axis. At least one payload momentum wheel may be coupled to the gimbal at the gimbal axis and configured to counteract angular torque which would otherwise be imparted to the spacecraft bus.

The outer space-based vehicle may include a momentum control arrangement coupled to the spacecraft bus. The momentum control arrangement is not operated during selective rotation of the payload about the gimbal axis.

The outer space-based vehicle may include a controller configured to control the gimbal and the at least one payload momentum wheel. The control may be a feedback control arrangement or a feedforward control arrangement.

The payload may include a payload body and a counterweight coupled thereto. The satellite bus may include at least one transceiver for communication with another satellite.

The at least one payload momentum wheel may include a pair of spaced apart momentum wheels, with the gimbal positioned between the momentum wheels. The payload may include a radio frequency (RF) antenna or at least one solar panel, for example.

Another aspect is directed to a payload steering arrangement for an outer space-based vehicle comprising a spacecraft bus and the payload. The payload has a payload center of mass. The steering arrangement may include a gimbal to be coupled between the spacecraft bus and the payload. The gimbal has a gimbal axis to be aligned with the payload center of mass, and configured to selectively rotate the payload about the gimbal axis. At least one payload momentum wheel may be coupled to the gimbal at the gimbal axis, and configured to counteract angular torque which would otherwise be imparted to the spacecraft bus.

Yet another aspect is directed to a method for steering a payload for an outer space-based vehicle as described above. The method may include operating a gimbal coupled between the spacecraft bus and the payload to selectively rotate the payload about a gimbal axis, with the gimbal axis being aligned with the payload center of mass. The method may further include operating at least one payload momentum wheel coupled to the gimbal at the gimbal axis to counteract angular torque which would otherwise be imparted to the spacecraft bus.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations may be used to indicate similar elements in different embodiments.

Figure 1:
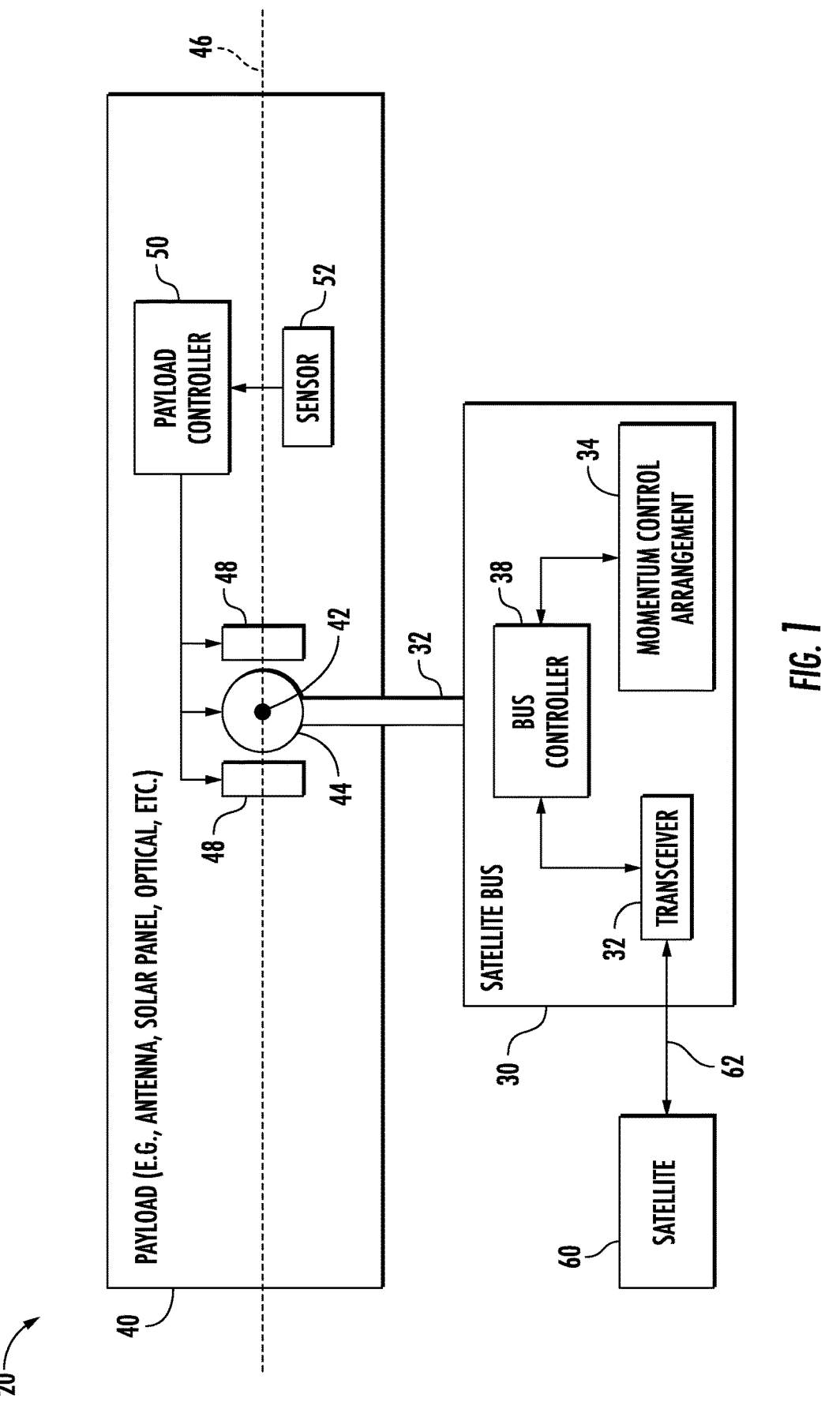
FIG. 1 is a schematic diagram of an outer space-based vehicle with a payload steering arrangement in which various aspects of the disclosure may be implemented.

Referring initially to FIG. 1, an outer space-based vehicle 20 includes a spacecraft bus 30, a payload 40 having a payload center of mass 42, and a gimbal 44 coupled between the spacecraft bus 30 and the payload 40 via an arm 32. The gimbal 44 has a gimbal axis 46 aligned with the payload center of mass 42 and is configured to selectively rotate the payload 40 about the gimbal axis.

At least one payload momentum wheel 48 is coupled to the gimbal 44 at the gimbal axis 46. The at least one payload momentum wheel 48 is configured to counteract angular torque which would otherwise be imparted to the spacecraft bus 30 during rotation of the payload 40 about the gimbal axis 46. The gimbal 44 and the at least one payload momentum wheel 48 form a cost effective payload steering arrangement for the payload 40 while not changing the attitude of the satellite bus 30 during rotation of the payload 40.

The payload 40 may be a deployable radio frequency (RF) antenna, a deployable solar panel or a deployable optical device, for example. The optical device may be an electro-optical/infra-red (EO/IR) type device, such as a telescope, for example. Once the outer space-based vehicle 20 is in orbit, the payload 40 is placed in a deployed position. The size of the payload 40 in the deployed positioned may be significantly larger in size than the size of the satellite bus 30. Consequently, the mass of the payload 40 may be considerably more than the mass of the satellite bus 30.

The antenna may include a plurality of antenna sections being stacked in a stored position and extended in end-to-end relation in a deployed position. In the deployed position, the antenna may be rotated by the gimbal 44 to be directed towards the earth's surface.

Likewise, the solar panel may include a plurality of solar panel sections being stacked in a stored position and extended in end-to-end relation in a deployed position. In the deployed position, the solar panel may be rotated by the gimbal 44 to be directed towards the sun.

The payload 40 is to be rotated about the gimbal axis 46 without causing a change in attitude of the satellite bus 30. A change in attitude of the satellite bus 30 may have a negative impact on inter-satellite communications, for example.

For inter-satellite communications, the satellite bus 30 includes a transceiver 32 for communicating with another satellite 60, such as a CubeSat, for example. The transceiver 32 may be configured to establish an optical crosslink 62 with the other satellite 60. The optical crosslink 62 requires the transceiver 32 to be accurately directed towards the other satellite 60. A change in attitude of the satellite bus 30 may break the optical crosslink 62.

The satellite bus 30 includes a bus controller 38 configured to operate a momentum control arrangement 34 for three-axis attitude control of the satellite bus 30. The momentum control arrangement 34 may include momentum wheels or control moment gyroscopes (CMG), for example. Each respective axis would have its own momentum wheel or CMG. The momentum wheels or the CMGs are continuously spinning under control of the bus controller 38 to maintain a desired attitude of the satellite bus 30.

When the mass of the payload 40 is larger than the mass of the satellite bus 30, the momentum control arrangement 34 may not be able to generate sufficient torque to counter the angular momentum of the payload 40. As a result, the attitude of the satellite bus 30 would change. To prevent this from happening, the at least one payload momentum wheel 48 advantageously counteracts the angular torque generated in response to the gimbal 44 rotating the payload 40 about the gimbal axis 46. Consequently, the momentum control arrangement 34 does not need to be operated during rotation of the payload 40.

Since the attitude of the satellite bus 30 does not change, the satellite bus 30 may not be aware of movement of the payload 40. The payload 40 is a bus-agnostic payload. This allows the payload 40 to be rotated without requiring any action by the satellite bus 30. Consequently, the satellite bus 30 does not require a complex and costly momentum control arrangement 34 to counter the angular torque generated by rotation of the payload 40 by the gimbal 44.

As noted above, an axis 46 of the gimbal 44 is aligned with the payload center of mass 42, and the center of rotation of the payload 40 is about the gimbal axis 46. As illustrated, the payload center of mass 42 may be at a center of the payload 40. To counter the angular torque generated by the gimbal 44, the at least one payload momentum wheel 42 is also aligned with the gimbal axis 46.

The illustrated payload 40 moves about a single axis, i.e., the gimbal axis 46. In other embodiments, the payload 40 may be rotated about more than one axis. In the other embodiments, a respective gimbal 44 and a respective at least one momentum wheel 48 would be required for each axis.

Operation of a single payload momentum wheel 42 may impart its own angular torque on the satellite bus 30. To address this, a pair of payload momentum wheels 42 are used, with the gimbal 44 positioned between the payload momentum wheels 42. In this configuration, operation of a payload momentum wheel 42 on each side of the gimbal 44 offset the angular torque that may have occurred when operating a single payload momentum wheel 42.

The payload 40 includes a controller 50 to control operation of the gimbal 44 and the payload momentum wheels 48. As the controller 50 operates the gimbal 44 to rotate the payload 40 in one direction, the controller 50 rotates the payload momentum wheels 48 in the opposite direction. Typically, the payload momentum wheels 48 do not rotate when the payload 40 is stationary. The payload momentum wheels 48 are rotated by the controller 50 during rotation of the payload 40 by the gimbal 44.

The controller 50 is to match acceleration of the angular rotation of the payload momentum wheels 48 to acceleration of the angular rotation of the payload 40. This allows rapid slewing of the payload 40 without introducing attitude disturbance to the satellite bus 30.

In one embodiment, the controller 50 controls the gimbal 44 and the momentum wheels 48 in a feedforward control arrangement. The momentum wheels 48 are proactively controlled in response to control of the gimbal 44. That is, the gimbal 44 and the momentum wheels 48 are simultaneously controlled. This helps to minimize or reduce jitter to the satellite bus 30 during rotation of the payload 40. In the feedforward control arrangement, respective control signals are provided by the controller 50 at the same time to the gimbal 44 and to the momentum wheels 48.

In another embodiment, the controller 50 controls the gimbal 44 and the momentum wheels 48 in a feedback control arrangement. That is, the momentum wheels 48 are reactively controlled in response to control of the gimbal 44. At least one sensor 52 is used to determine a change in motion of the payload 40. The change in motion may be the result of acceleration forces applied to the payload 40 by the gimbal 44. The sensor 52 may be an accelerometer, for example. In the feedback control arrangement, a control signal is first applied by the controller 50 to the gimbal 44 to selectively rotate the payload 40. In response to the sensor 52 determining a change in motion of the payload 40, then the controller 50 applies a second control signal to the momentum wheels 48.

Figure 2:
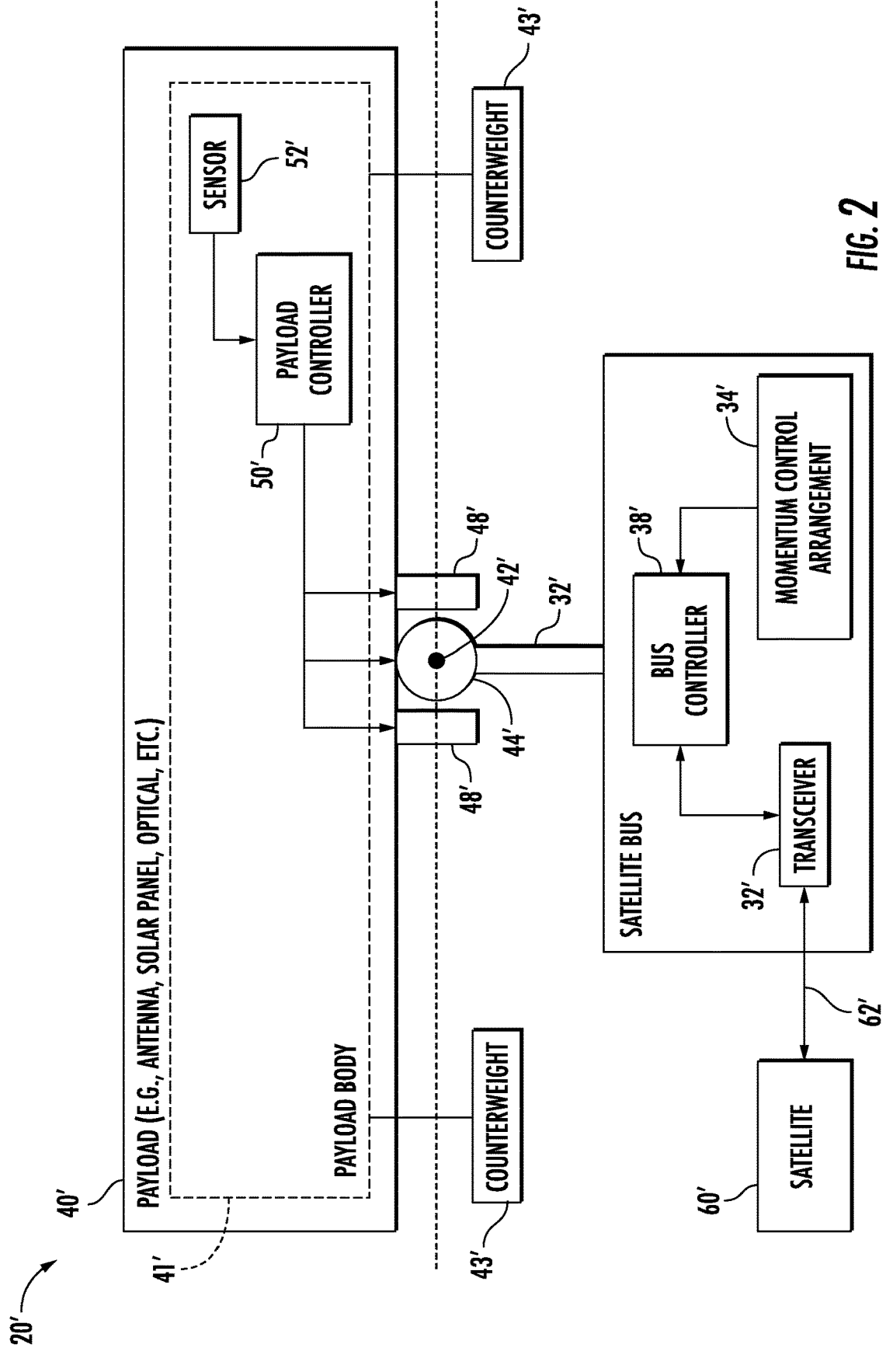
FIG. 2 is a schematic diagram of another embodiment of the outer space-based vehicle with the payload steering arrangement illustrated in FIG. 1.

Referring now to FIG. 2, another embodiment of the outer space-based vehicle 20' may further includes a payload body 41' and at least one counterweight 43' coupled to the payload body 41'. The at least one counterweight 43' is used to change location of the center of mass 42' of the payload 40'. The at least one counterweight 43' may include a pair of spaced apart counterweights 43' coupled to the payload body 41'.

The counterweights 43' are sized and positioned so that the center of mass 42' of the payload 40' is offset from the center of the payload 40'. This allows the payload 40' to be rotated about a gimbal axis 46' that is not centered with the payload 40'. The gimbal 44' is coupled between the spacecraft bus 30' and the payload 40' so that the gimbal axis 46' is still aligned with the payload center of mass 42'.

To counter the angular torque generated by the gimbal 44', the payload momentum wheels 42' are also aligned with the gimbal axis 46'. The payload 40' is to be rotated about the gimbal axis 46' without causing a change in attitude of the satellite bus 30'.

The controller 50' controls operation of the gimbal 44' and the payload momentum wheels 48'. As the controller 50 operates the gimbal 44' to rotate the payload 40' in one direction, the controller 50' rotates the payload momentum wheels 48' in the opposite direction. The payload momentum wheels 48' are rotated by the controller 50' during rotation of the gimbal 44'.

Figure 3:
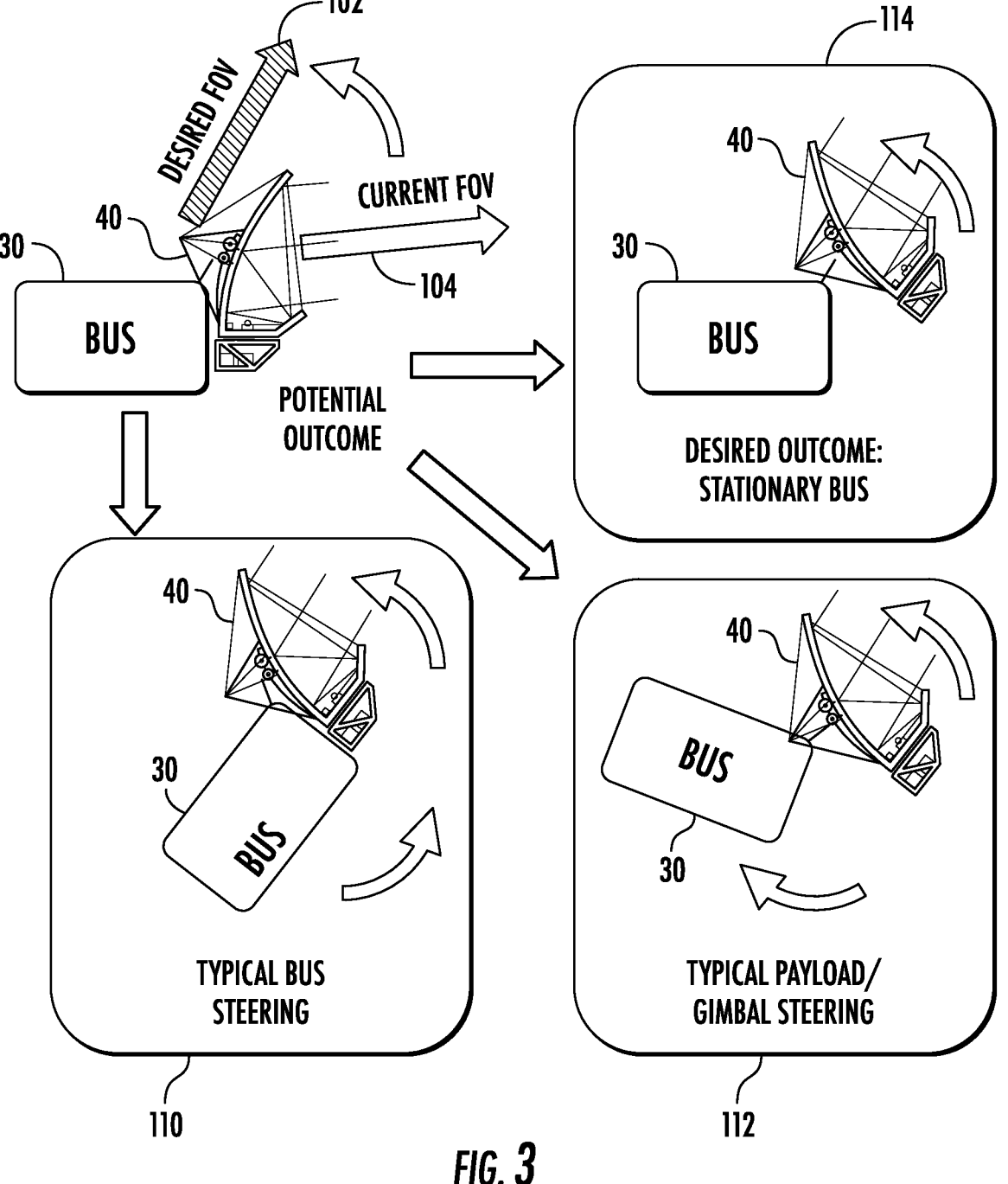
FIG. 3 is a comparison of the payload steering arrangement illustrated in FIG. 1 with other approaches to steering the payload.

Referring now to FIG. 3, the payload steering arrangement as discussed above will be compared to other approaches to steering the payload 40. The payload 40 is coupled to the satellite bus 30 and is configured as an antenna. In other embodiments, the payload 40 may be configured as a solar panel or an optical device, for example. From the start, the antenna is initially positioned to have a current field of view (FOV), as indicated by arrow 100. The antenna is to be rotated to a desired field of view (FOV), as indicated by arrow 102.

For the approach in box 110, the antenna remains in a fixed position with respect to the satellite bus 30. To rotate the antenna to the desired field of view 102, the satellite bus 30 is rotated. A disadvantage of this approach is that that the attitude of the satellite bus 30 is changed, which may negatively affect inter-satellite communications. For example, if the satellite bus 30 has established an optical crosslink with another satellite, then the beam may be broken by the change in the attitude of the satellite bus 30.

For the approach in box 112, a gimbal is used to rotate the antenna to the desired field of view 102. The angular torque generated by the gimbal is to be countered by the satellite bus 30. The momentum control arrangement in the satellite bus 30 is used to try to maintain the attitude of the satellite bus 30. A disadvantage of this approach is that the satellite bus 30 may not provide enough torque to counter payload angular momentum. This is typically the case when the mass of the payload 40 is more than the mass of the satellite bus 30. As a result, rotation of the payload 40 causes the satellite bus to change its attitude.

The approach in box 116 corresponds to the payload steering arrangement as discussed above. As the gimbal rotates the payload 40, the payload momentum wheels 48 are used to counteract the angular torque generated by the gimbal 44. As a result, the attitude of the satellite bus 30 does not change.

Figure 4:
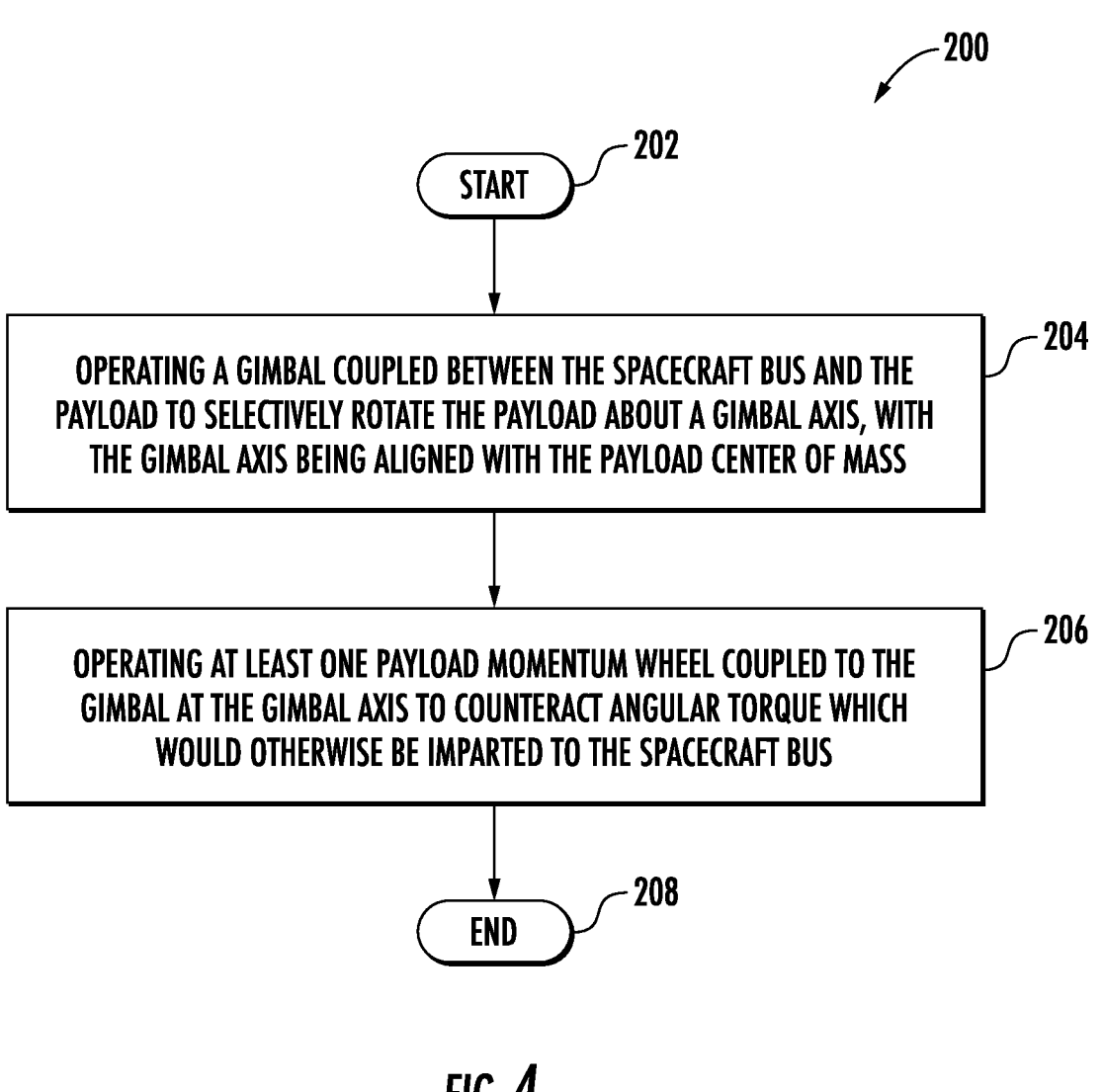
FIG. 4 is a flow diagram on a method for steering the payload for the outer space-based vehicle illustrated in FIG. 1.

Referring now to FIG. 4, a flow diagram 200 on a method for steering the payload 40 for an outer space-based vehicle 20 will be discussed. From the start (Block 202), the method includes operating a gimbal 44 coupled between the spacecraft bus 30 and the payload 40 to selectively rotate the payload about a gimbal axis 46 at Block 204. The gimbal axis 46 is aligned with the payload center of mass 42. At least one payload momentum wheel 48 coupled to the gimbal 44 at the gimbal axis 46 is operated at Block 206 to counteract angular torque which would otherwise be imparted to the spacecraft bus 30. The method ends at Block 208.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. An outer space-based vehicle comprising:
a spacecraft bus;
a payload having a payload center of mass;
a gimbal coupled between the spacecraft bus and the payload to move the payload with respect to the spacecraft bus, the gimbal having a gimbal axis aligned with the payload center of mass and configured to selectively rotate the payload about the gimbal axis; and
at least one payload momentum wheel coupled to the gimbal at the gimbal axis and configured to counteract angular torque which would otherwise be imparted to the spacecraft bus during movement of the payload with respect to the spacecraft bus.

2. The outer space-based vehicle according to claim 1 comprising a momentum control arrangement coupled to the spacecraft bus; and wherein the momentum control arrangement is not operated during selective rotation of the payload about the gimbal axis.

3. The outer space-based vehicle according to claim 1 comprising a controller configured to control the gimbal and the at least one payload momentum wheel in a feedback control arrangement.

4. The outer space-based vehicle according to claim 1 comprising a controller configured to control the gimbal and the at least one payload momentum wheel in a feedforward control arrangement.

5. The outer space-based vehicle according to claim 1 wherein the payload comprises a payload body and a counterweight coupled thereto.

6. The outer space-based vehicle according to claim 1 wherein the satellite bus comprises at least one transceiver for communication with another satellite.

7. The outer space-based vehicle according to claim 1 wherein the at least one payload momentum wheel comprises a pair of spaced apart momentum wheels, with the gimbal positioned between the momentum wheels.

8. The outer space-based vehicle according to claim 1 wherein the payload comprises a radio frequency (RF) antenna.

9. The outer space-based vehicle according to claim 1 wherein the payload comprises at least one solar panel.

10. The outer space-based vehicle according to claim 1 wherein the payload comprises an optical device.

11. A payload steering arrangement for an outer space-based vehicle comprising a spacecraft bus and the payload, the payload having a payload center of mass, the steering arrangement comprising:
a gimbal to be coupled between the spacecraft bus and the payload to move the payload with respect to the spacecraft bus, the gimbal having a gimbal axis to be aligned with the payload center of mass and configured to selectively rotate the payload about the gimbal axis; and
at least one payload momentum wheel coupled to the gimbal at the gimbal axis and configured to counteract angular torque which would otherwise be imparted to the spacecraft bus during movement of the payload with respect to the spacecraft bus.

12. The payload steering arrangement according to claim 11 wherein the spacecraft bus comprises a momentum control arrangement that is not operated during selective rotation of the payload about the gimbal axis.

13. The payload steering arrangement according to claim 11 comprising a controller configured to control the gimbal and the at least one payload momentum wheel in a feedback control arrangement.

14. The payload steering arrangement according to claim 11 comprising a controller configured to control the gimbal and the at least one payload momentum wheel in a feedforward control arrangement.

15. The payload steering arrangement according to claim 11 wherein the payload comprises a payload body and a counter weight coupled thereto.

16. The payload steering arrangement according to claim 11 wherein the satellite bus comprises at least one transceiver for communication with another satellite.

17. The payload steering arrangement according to claim 11 wherein the at least one payload momentum wheel comprises a pair of spaced apart momentum wheels, with the gimbal positioned between the momentum wheels.

18. The payload steering arrangement according to claim 11 wherein the payload comprises a radio frequency (RF) antenna.

19. The payload steering arrangement according to claim 11 wherein the payload comprises at least one solar panel.

20. A method for steering a payload for an outer space-based vehicle comprising a spacecraft bus and the payload, the payload having a payload center of mass, the method comprising:

operating a gimbal coupled between the spacecraft bus and the payload to move the payload with respect to the spacecraft bus to selectively rotate the payload about a gimbal axis, with the gimbal axis being aligned with the payload center of mass; and operating at least one payload momentum wheel coupled to the gimbal at the gimbal axis to counteract angular torque which would otherwise be imparted to the spacecraft bus during movement of the payload with respect to the spacecraft bus.

21. The method according to claim 20 comprising a momentum control arrangement that is not operated during selective rotation of the payload about the gimbal axis.

22. The method according to claim 20 comprising controlling the gimbal and the at least one payload momentum wheel in a feedback control arrangement.

23. The method according to claim 20 comprising controlling the gimbal and the at least one payload momentum wheel in a feedforward control arrangement.

24. The method according to claim 20 wherein the payload comprises a payload body and a counterweight coupled thereto.

25. The method according to claim 20 wherein the satellite bus comprises at least one transceiver for communicating with another satellite.

26. The method according to claim 20 wherein the at least one payload momentum wheel comprises a pair of spaced apart momentum wheels, with the gimbal positioned between the momentum wheels.

27. The method according to claim 20 wherein the payload comprises a radio frequency (RF) antenna.

28. The method according to claim 20 wherein the payload comprises at least one solar panel.

29. The method according to claim 20 wherein the payload comprises an optical device.

\* \* \* \* \*